United States Patent [19]

Dougherty

[11] Patent Number: 4,981,662

[45] Date of Patent: Jan. 1, 1991

[54] STABILIZED HYDROGEN PEROXIDE

[75] Inventor: Edward F. Dougherty, League City, Tex.

[73] Assignee: FMC Corporation, Philadelphia, Pa.

[21] Appl. No.: 531,619

[22] Filed: Jun. 1, 1990

[51] Int. Cl.$^5$ ............................................ C01B 15/037
[52] U.S. Cl. .................................... 423/272; 423/273; 423/584
[58] Field of Search ........................ 423/272, 273, 584

[56] References Cited

U.S. PATENT DOCUMENTS

| | | | |
|---|---|---|---|
| 2,624,655 | 1/1953 | Greenspan | 23/207.5 |
| 2,914,374 | 11/1959 | Harris et al. | 8/111 |
| 3,043,658 | 7/1962 | Banfield | 23/166 |
| 3,575,126 | 8/1972 | Smeets | 252/99 |
| 4,269,956 | 5/1981 | Gaylord | 526/192 |

OTHER PUBLICATIONS

Z. Chem. 22, p. 392 (1982).
Schumb et al., "Hydrogen Peroxide", Reinhold Publishing Co., N.Y. (1955), pp. 535–546.
Chemical Abstracts 98: 23056k (1983).

Primary Examiner—Wayne A. Langel
Attorney, Agent, or Firm—R. E. Elden; P. C. Baker; R. L. Andersen

[57] ABSTRACT

A stable hydrogen peroxide composition is provided of from 1% to 52% by weight hydrogen peroxide and 1,10-phenanthroline. The composition may contain other conventional additives suitable for stabilizing hydrogen peroxide.

12 Claims, No Drawings

STABILIZED HYDROGEN PEROXIDE

The present invention is an aqueous hydrogen peroxide composition stabilized against decomposition by catalytically-active transition metals.

Hydrogen peroxide is a well-known commercial chemical which, on decomposition, forms water and oxygen. Schumb, et al., *Hydrogen Peroxide*, Reinhold Publishing Co., New York (1955) discloses at page 535 to 536 that if hydrogen peroxide could be prepared and kept in the total absence of catalytically active materials, no stabilizers would be needed to insure storage for long periods at ordinary temperature without appreciable loss by decomposition. Thus highly concentrated hydrogen peroxide is commercially available nearly completely free of additives, and yet may be transported and stored safely in aluminum drums. However, in the presence of more than minute proportions of catalytically active contaminants it is impossible to restrain the decomposition of hydrogen peroxide by the addition of stabilizers.

Schumb et al. view the stabilization process as the inactivation of the catalytically active substances, recognizing that the limitations on acceptable stabilizers are set by the deteriorating action of the hydrogen peroxide on the stabilizer, and by the various ways in which the hydrogen peroxide may be used.

The generally-preferred stabilizer is tin supplied as an alkali-metal stannate which forms a stannic oxide sol. The sol is usually stabilized by a peptizing agent, such as a phosphate or a phosphonic acid. Organic stabilizers are frequently employed for dilute hydrogen peroxide (under 8%), but are not recommended for greater concentrations (up to 52%) according to Schumb et al. because organic substances, in general, are subject to a slow oxidation at ordinary temperatures by hydrogen peroxide. Therefore, their use as stabilizers has not proven adequate for long-term storage of higher concentrations of up to 52% hydrogen peroxide. This is confirmed by U.S. Pat. No. 2,624,655 to Greenspan which teaches pyridine carboxylic acids are useful for stabilizing 35% hydrogen peroxide solutions, however, inorganic phosphorus compounds, such as condensed phosphates and phosphoric acid are required for maximum efficacy. Schumb et al. also disclose 8-hydroxyquinoline has been suggested as a stabilizer for more concentrated hydrogen peroxide, but also only in the presence of inorganic phosphates. Some organic compounds apparently inactivate the transition metals by forming inert complexes. Even so, gradual oxidation of the organic compound reduces the stabilization effect to a few months.

On the other hand, some organic compounds form metal complexes which accelerate the decomposition of hydrogen peroxide. For example, U.S. Pat. No. 3,043,658 to Banfield teaches that tripyridyl is approximately equivalent to $\alpha,\alpha'$-dipicolinic acid as a stabilizer for hydrogen peroxide, provided however, that all traces of dipyridyl are eliminated. The patent teaches that dipyridyl forms metal complexes with some metal ions and these metal ion complexes are vigorous decomposition catalysts for hydrogen peroxide.

Very stringent specifications must be met by hydrogen peroxide for specialized uses, such as high purity hydrogen peroxide, for use by the semiconductor industry or for use as a reagent chemical. In such application, the hydrogen peroxide must be stable so that it will not decompose if contaminated with common decomposition catalysts, yet must contain the minimum additives possible in order to meet special needs. Generally, the hydrogen peroxide concentration specified is between 25% and 35% $H_2O_2$ by weight but concentrations may range from 1% to 52%. Typical specifications are a maximum of 20 mg/l residue on evaporation, 5 mg/l sulfate and 1 mg/l each for aluminum, potassium, sodium and tin. Maximum limits for common transition metals known to be decomposition catalysts are 0.1 mg/l for iron and manganese and 0.05 for copper. Clearly a need exists for an alternative stabilizer for hydrogen peroxide to alkali metal stannate.

The present invention overcomes the disadvantages of prior art stabilizers by providing a stable aqueous hydrogen peroxide composition comprising from 1% to 52% by weight hydrogen peroxide, and an effective amount of 1,10-phenanthroline to stabilize the hydrogen peroxide in the presence of transition metal decomposition catalysts. The composition may contain other conventional additives and stabilizers.

It is contemplated that the present invention includes the process of stabilizing an aqueous hydrogen peroxide, the process which comprises incorporating an effective amount of 1,10-phenanthroline into an aqueous solution of from 1% to 52% by weight hydrogen peroxide. The 1,10-phenanthroline may optionally be oxidized before being incorporated to stabilize the hydrogen peroxide solution.

A particularly desirable embodiment of this invention is a composition consisting of compounds of hydrogen, oxygen, carbon and nitrogen, said compounds comprising 1% to 52% by weight aqueous hydrogen peroxide and a stabilizing amount of 1,10-orthophenanthroline. The composition may contain as additives compounds stable in the presence of hydrogen peroxide, such as, nitric acid, phthalic acid and other compounds of hydrogen, oxygen, carbon and nitrogen. Such a composition is valuable for applications in the electronics industry in that compounds such as tin, phosphorus and the like are potential contaminants for some applications.

The quantity of 1,10-phenanthroline can be varied over a wide range, desirably between 1 and 1000 mg/l. The range of between 1 and 200 mg/l is particularly effective, and the range of 1 and 20 mg/l is preferable for some applications.

It was unexpected that 1,10-phenanthroline (also called o-phenanthroline) would be effective for stabilizing aqueous hydrogen peroxide in view of its close similarity to dipyridyl which forms metal complexes which are vigorous peroxygen decomposition catalysts. However, even in the presence of added metal ions the 1,10-orthophenanthroline is effective as a peroxygen stabilizer for up to 52% hydrogen peroxide. This is particularly surprising in that the iron complex of 1,10-phenanthroline is the wellknown oxidation-reduction indicator ferroin (1,10-phenanthroline ferrous complex).

The standard method of comparing the stabilization effect of additives is to determine the loss of hydrogen peroxide in 24 hours at 100° C. Stability is defined as the weight percent hydrogen peroxide remaining at the end of the test (100% − % lost).

The best method of practicing the invention is illustrated by the following nonlimiting examples.

Unless otherwise specified the stability was determined by measuring the rate of oxygen formation (ml/min) from a 25 ml sample of hydrogen peroxide maintained at a constant temperature (100° C.). The readings were determined, usually every half-hour to ensure a steady state was observed. The 24 hour stability was calculated by extrapolating the average rate in cc/min to calculate g$H_2O_2$ decomposed in 24 hours.

Concentrations reported as percent herein are percent by weight unless specifically identified otherwise.

EXAMPLE 1

Duplicate samples of unstabilized 35% hydrogen peroxide and samples containing 100 mg/l 1,10-phenanthroline were compared at 91° C. and 100° C. The results are presented as Table I.

During the period the samples were approaching the test temperature the rate of gas evolution from the samples containing 1,10-phenanthroline was greater than 1 ml/min. The data indicate that the effect of temperature on decomposition rate is complex and is unpredictable. However, Table I clearly shows the efficacy of 1,10-phenanthroline as a stabilizer. A yellow color developed in the 1,10-phenanthroline samples during the run.

EXAMPLE 2

Example 1 was repeated at 100° C. with several stabilizer systems as described in Table II. The data are indicated in summary form as percent stability. The Table illustrates that 1,10-phenanthroline is compatible with phosphoric acid and tin (frequently employed in stabilizer formulations). The Table also indicates that citric acid, although initially effective, fails after a few hours. Another compound, diethyleneaminepentaacetic acid while effective alone is not effective in the presence of phosphoric acid.

EXAMPLE 3

An investigation was made to determine whether the stabilizer was 1,10-phenanthroline itself or a compound produced by oxidation with hydrogen peroxide.

A 1% solution of 1,10-phenanthroline was prepared in 35% hydrogen peroxide. The solution was maintained at 100° C. for about 1 hour. The solution was initially colorless but changed sequentially to green and finally brown. Bubbles of gas, presumably oxygen evolved freely during the heating period.

A sufficient quantity of the highly-colored solution was added to unstabilized 35% hydrogen peroxide equivalent to 100 mg/l and 10 mg/l 1,10-phenanthroline. The stabilities respectively were 97.83% and 94.49% while the stability of the control unstabilized hydrogen peroxide was 91.42%. No bubbling was observed during the heat up period of the stabilized samples.

This indicates that the oxidized (pre-reacted) 1,10-phenanthroline is also a stabilizer for hydrogen peroxide, although not as effective as 1,10-phenanthroline itself.

TABLE I

EFFECT OF o-PHENANTHROLINE ON OXYGEN OF 35% $H_2O_2$

| Minutes | 91° C. Control | | 100 mg/l o-P | | 100° C. Control | | 100 mg/l o-P | |
|---|---|---|---|---|---|---|---|---|
| 0 | .435 | .502 | .073 | .078 | .552 | .623 | .301 | .292 |
| 30 | .509 | .567 | .061 | .048 | .542 | .624 | .314 | .306 |
| 60 | .509 | .553 | .087 | .054 | .572 | .624 | .361 | .335 |
| 90 | .488 | .572 | .087 | .056 | .584 | .624 | .363 | .336 |
| 120 | .529 | .580 | .113 | .074 | .600 | .624 | .387 | .358 |
| 150 | .538 | .590 | .117 | .094 | .622 | .624 | .417 | .356 |
| 180 | .569 | .603 | .101 | .088 | .613 | .624 | .409 | .340 |
| 210 | .542 | .605 | .124 | .089 | .611 | .624 | .414 | .351 |
| 240 | .603 | .613 | .149 | .112 | .600 | .624 | .402 | .363 |
| 270 | .597 | .611 | .155 | .121 | .609 | .624 | .408 | .348 |
| 300 | .599 | .606 | .141 | .116 | .635 | .624 | .427 | .345 |
| Av. | .538 | .582 | .110 | .085 | .595 | .624 | .382 | .339 |
| Stab. | 81.45% | 79.93% | 96.21% | 97.07% | 79.52% | 78.52% | 86.85% | 88.33% | o-P - 1,10-phenanthroline

TABLE II

COMPARISON OF 1,10-PHENANTHROLINE WITH OTHER STABILIZER SYSTEMS

| No. | Stabilizer System mg/l | Stabilizer | % Stability | (Replicate) |
|---|---|---|---|---|
| 1 | 100 | 1,10-phenanthroline | 93.37 | 94.09 |
| 2 | 100 2 | 1,10-phenanthroline phosphoric acid | 96.51 | 96.17 |
| 3 | 100 10 | 1,10-phenanthroline tin(as potassium stannate) | 99.9 | 99.7 |
| 4 | 100 | citric acid | 87.11* | not calc.* |
| 5 | 100 2 | citric acid phosphoric acid | 99.65 | |
| 6 | 100 | DETPA** | 96.87 | |
| 7 | 100 2 | DETPA** phosphoric acid | 64.30 | |

*after about four hours the rate of oxygen evolution increased over an order of magnitude
**DETPA - diethyleneaminepentaacetic acid

I claim:

1. A stable aqueous hydrogen peroxide composition comprising from 1% to 52% by weight hydrogen peroxide and an effective amount of 1,10-phenanthroline to stabilize the hydrogen peroxide against decomposition by transition metals.

2. The composition of claim 1 comprising from 1 to 200 mg/l of 1,10-phenanthroline.

3. The composition of claim 1 comprising from 25% to 35% hydrogen peroxide and from 10 to 20 mg/l 1,10-phenanthroline.

4. The composition of claim 1 wherein the composition also comprises a stabilizing amount of a compound selected from the group consisting of a tin compound and a phosphate compound.

5. The process of stabilizing aqueous hydrogen peroxide comprising incorporating from 1 to 200 mg/l of 1,10-phenanthroline into an aqueous solution of from 1% to 52% hydrogen peroxide by weight.

6. The process of claim 5 wherein the 1,10-phenanthroline is oxidized before incorporation into the aqueous solution of hydrogen peroxide.

7. A stable aqueous hydrogen peroxide composition consisting of compounds of hydrogen, oxygen, carbon and nitrogen, said compounds comprising 1% to 52% by weight aqueous hydrogen peroxide and a stabilizing amount of 1,10-orthophenanthroline.

8. The composition of claim 7 comprising between 1 to 200 mg/l of 1,10-phenanthroline.

9. The composition of claim 7 comprising between 1 and 20 mg/l 1,10-phenanthroline.

10. The composition of claim 7 wherein the concentration of hydrogen peroxide is between 25% and 35% by weight.

11. The composition of claim 8 wherein the concentration of hydrogen peroxide is between 25% and 35% by weight.

12. The composition of claim 9 wherein the concentration of hydrogen peroxide is between 25% and 35% by weight.

* * * * *